United States Patent
Simm et al.

(10) Patent No.: US 9,475,164 B2
(45) Date of Patent: Oct. 25, 2016

(54) HANDHELD POWER TOOL HAVING A DUST EXTRACTOR

(75) Inventors: Robert Simm, Oekingen (CH); Weihong Li, Hangzhou (CN); Qun Zhou, Hangzhou (CN); Yi Lv, Hanggzhou (CN); Wei Liu, Hanggzhou (CN); Gendang Zhang, Hanggzhou (CN); Achim Duesselberg, Leinfelden (DE); Xuejing Chen, Hangzhou (CN)

(73) Assignee: Robert Bosch GmbH, Stuttgart (DE)

( * ) Notice: Subject to any disclaimer, the term of this patent is extended or adjusted under 35 U.S.C. 154(b) by 1099 days.

(21) Appl. No.: 12/671,795

(22) PCT Filed: Jun. 6, 2008
(Under 37 CFR 1.47)

(86) PCT No.: PCT/EP2008/057090
§ 371 (c)(1),
(2), (4) Date: May 1, 2013

(87) PCT Pub. No.: WO2009/019057
PCT Pub. Date: Feb. 12, 2009

(65) Prior Publication Data
US 2013/0319711 A1    Dec. 5, 2013

(30) Foreign Application Priority Data
Aug. 3, 2007  (DE) .................. 10 2007 036 783

(51) Int. Cl.
*B23Q 11/00* (2006.01)
*A47L 9/14* (2006.01)

(52) U.S. Cl.
CPC .......... *B23Q 11/0071* (2013.01); *A47L 9/1409* (2013.01); *A47L 9/1454* (2013.01); *B23Q 11/0046* (2013.01); *Y02P 70/171* (2015.11)

(58) Field of Classification Search
CPC .......... B23Q 11/0042; B23Q 11/0046; B23Q 11/0071; A47L 7/0095; A47L 9/1409–9/1454; F16K 15/033; F16K 21/04; F16K 21/06; F16K 15/036; Y10T 137/7898
USPC .................. 173/197, 198, 58; 451/453, 456; 251/322, 337, 298, 301, 303; 137/527
See application file for complete search history.

(56) References Cited

U.S. PATENT DOCUMENTS

| 1,266,130 | A | * | 5/1918 | Kimbler | ................ | F16K 15/033 137/527 |
| 1,505,958 | A | * | 8/1924 | Huntting | ................... | 137/527.2 |

(Continued)

FOREIGN PATENT DOCUMENTS

DE    WO 03026840 A1 *  4/2003  ......... B23Q 11/0046

*Primary Examiner* — Stephen F Gerrity
*Assistant Examiner* — Joshua Kotis
(74) *Attorney, Agent, or Firm* — Maginot, Moore & Beck LLP

(57) ABSTRACT

A hand-held power tool is equipped with a dust extraction device which includes a dust box for holding dust. A closing flap is arranged in a tube section which lies in the flow path to the dust box, and this closing flap can be adjusted between the closed position and the open position. The closing flap is pivotably held in the region of the inner wall of the tube section and can be opened in the direction of the dust box. In the closed position, the closing flap bears against a stop which protrudes into the tube section, extends at an angle with respect to the direction of flow through the tube connection piece, and forms a stop line or stop area against which the closing flap correspondingly bears.

17 Claims, 6 Drawing Sheets

(56) References Cited

U.S. PATENT DOCUMENTS

| | | | |
|---|---|---|---|
| 3,990,471 A * | 11/1976 | Schutzer et al. | 137/527 |
| 4,196,745 A * | 4/1980 | Schutzer | 137/512.1 |
| 4,330,006 A * | 5/1982 | Eck | F16K 15/03 137/514 |
| 5,337,433 A * | 8/1994 | Gould et al. | 15/1.7 |
| 5,467,835 A * | 11/1995 | Obermeier et al. | 175/209 |
| 6,393,628 B1 * | 5/2002 | Kellogg | 4/490 |
| 6,514,131 B1 * | 2/2003 | Reich et al. | 451/344 |
| 6,830,507 B2 * | 12/2004 | Reich et al. | 451/453 |
| 7,455,486 B2 * | 11/2008 | Britz | 408/67 |
| 2002/0152731 A1 * | 10/2002 | Reich et al. | 55/385.1 |
| 2006/0153650 A1 * | 7/2006 | Simm et al. | 408/58 |
| 2008/0245531 A1 * | 10/2008 | Noske | E21B 21/08 166/373 |

\* cited by examiner

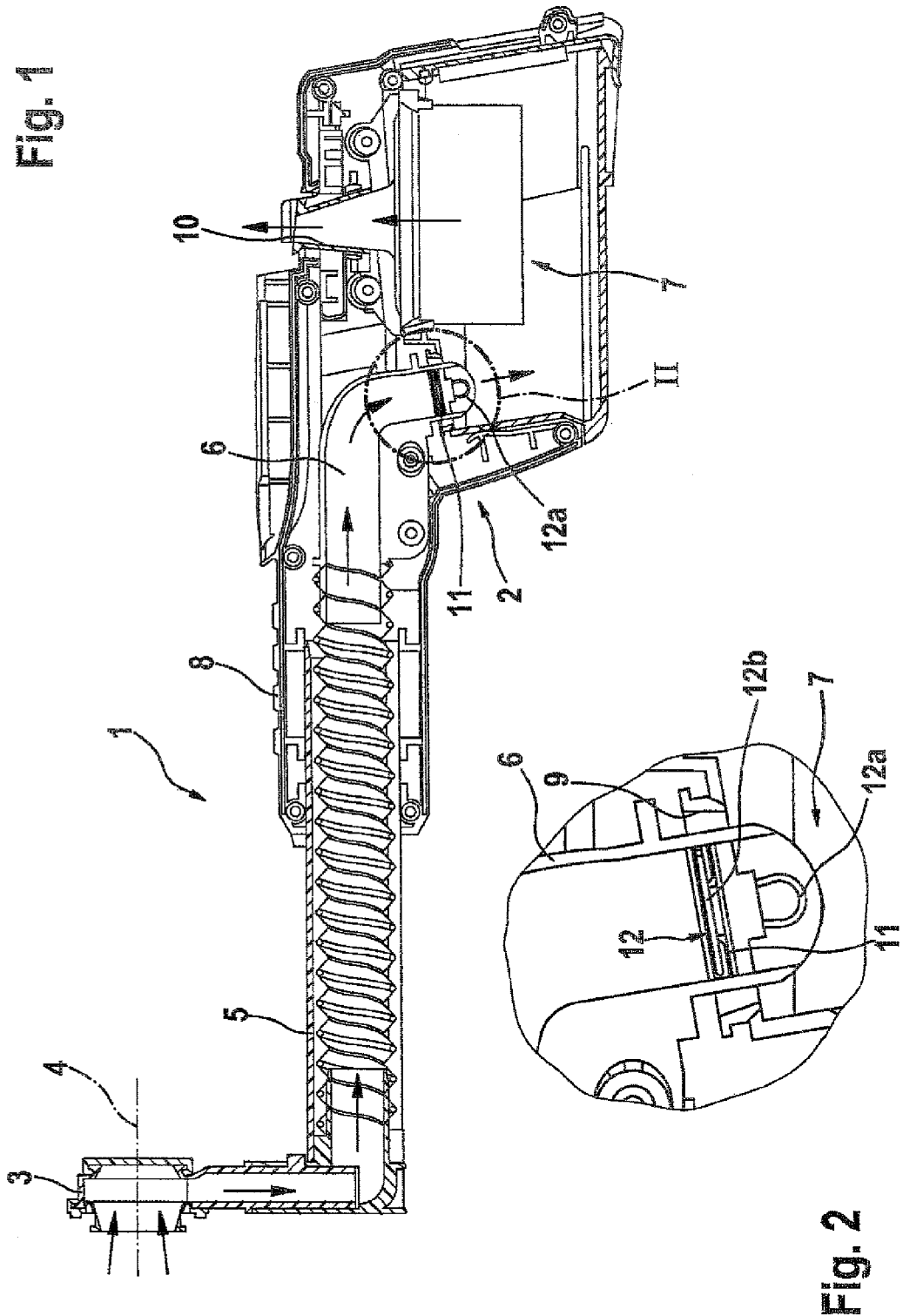

HANDHELD POWER TOOL HAVING A DUST EXTRACTOR

CROSS-REFERENCE TO RELATED APPLICATION

This application is a 35 USC 371 application of PCT/EP2008/057090 filed on Jun. 6, 2008.

BACKGROUND OF THE INVENTION

1. Field of the Invention

The invention relates to a handheld power tool having a dust extractor.

2. Description of the Prior Art

A handheld power tool of this kind is described in European Patent Disclosure EP 1 171 261 B1. The handheld power tool, designed as an oscillating sander, has a removable dust box in a housing, for receiving the grinding dust that is delivered to the dust box from the tool via a dust guide conduit. In a tubular portion of the dust guide conduit, at the transition to the receiving opening in the dust box, there is a pair of sealing flaps, with which it is intended to be assured that no dust can escape from the dust box back into the dust guide conduit. The pair of sealing flaps comprises a sealing material and is urged by force by its internal stress into a closing position, into which the two sealing flaps rest sealingly on one another and block the flow course. The sealing flaps open in the direction of the dust box, so that even a comparatively slight pressure of the air stream that delivers the sanding dust suffices to open the sealing flaps and open up the flow course into the dust box. In the opposite direction, conversely, the flow course is closed, since at a higher pressure in the dust box, the two sealing flaps are additionally pressed against one another, thus further reinforcing the closing position.

OBJECT AND ADVANTAGES OF THE INVENTION

The object of the invention is by simple structural provisions to prevent an unwanted return flow of dust from the dust box of a handheld power tool.

The handheld power tool according to the invention has a dust box for receiving the dust, and in a tubular portion which is located in the flow course from the tool of the handheld power tool to the dust box, there is at least one adjustable closing flap, which is held pivotably against the inner wall of the tubular portion and is intended to be opened in the direction of the dust box. A stop is disposed in the tubular portion and the closing flap rests on it in the closing position; the stop extends at an angle to the flow direction through the tube stub and forms a stop line or stop area on which the closing flap, in the closing position, rests with an accordingly linear or two-dimensional contact.

The linear or two-dimensional stop limits the motion of the closing flap into the closing position, while conversely the opening motion of the closing flap is unimpaired by the stop. In the closing position, the closing flap is in a secured position, so that if there is a reversal of the pressure conditions in the dust box or if other forces such as the rate of the closing flap itself are operative, an opening motion in the opposite direction, which could lead to a return flow of the sanding dust from the dust box back in the direction toward the tool, is reliably prevented.

Because of the linear or two-dimensional contact in the closing position, even comparatively soft closing flaps can be used without the risk that the closing flap will be deformed in an unwanted way and cause a flow course back from the dust box to be opened. Soft elastic closing flaps in particular can be used, which are made for instance from a sealing material such as rubber. The linear or two-dimensional contact of the closing flap on the stop stabilizes the closing flap. In addition, the closing flap can be urged in the direction of its closing position by force, in particular by internal stresses in the wall of the closing flap, thereby attaining a self-stabilizing effect.

In principle, various embodiments for the stop in the tubular portion can be considered. One possible example is an embodiment as a spring wire, which extends in the tubular portion at the angle to the flow course. The spring wire can at the same time be the holder of the closing flap and in particular can form a joint for pivoting the closing flap open and closed. This joint is embodied for instance as an eyelet-like wire portion of the spring wire that protrudes into a corresponding recess in the closing flap. This eyelet-like wire portion is adjoined on one or both sides by a bearing portion, which is received in a bearing point on the inner wall of the tubular portion. In the spring wire, there is also a middle stop portion, on which the closing flap rests in the closing position. The spring wire has the advantage of being simple to manufacture and easy to machine; in particular, it can be deformed three-dimensionally, and in its stop portion it can for instance extend in two directions in space, so as to form a two-dimensional contact. The bearing point on the inner wall is preferably embodied in one piece with the tubular portion, advantageously as a bearing groove into which the bearing portion of the spring wire is inserted.

In another advantageous embodiment, the stop is embodied as a step in the inner wall of the tubular portion. This embodiment has the advantage of not requiring any additional, separate component for the stop; instead, the stop forms an integral component of the inner wall of the tubular portion.

The stop extends at an angle to the flow course, and both a disposition perpendicular to the flow course and a disposition extending obliquely can be considered. Particularly in the embodiment of a stop as a step in the inner wall of the tubular portion, an obliquely extending stop can be selected, for opening and closing the closing flap by its own weight, depending on the position of the handheld power tool. In this instance it is recommended that the closing flap and the stop be disposed such that in the usual operating positions of the handheld power tool, the closing flap pivots by its own weight out of the closing position into the opening position, since in the regular operating positions, because of the disposition of the dust box at the bottom and the delivery of dust via an inflow opening at the top, an unintended return flow of sanding dust from the dust box is prevented. Conversely, if the handheld power tool is put into a position in which the accumulated sanding dust could flow back by its own weight via the inflow opening, the closing flap is subjected to a closing moment by the force of gravity, so that the flow course back to the tool is closed.

BRIEF DESCRIPTION OF THE DRAWINGS

Further advantages and expedient embodiments can be learned from the detailed description below in conjunction with the drawings, in which:

FIG. 1 is a section through a handheld power tool according to the invention, embodied as a power drill, which in its lower housing region is provided with a dust box;

FIG. 2 is an enlarged detail of the region of the closing flap;

DESCRIPTION OF THE PREFERRED EMBODIMENTS

Figure 3:
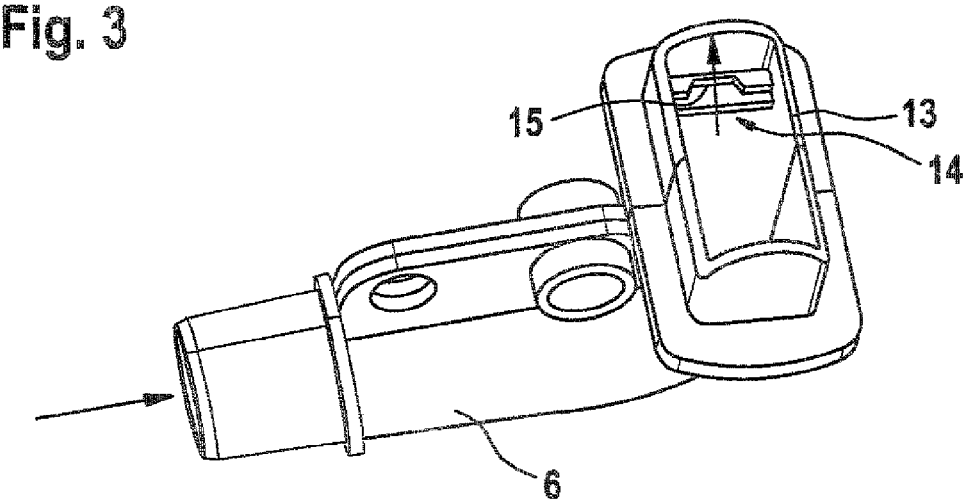
FIG. 3 is a perspective view of the tube elbow in a view from below.

In FIG. 1, what is shown of the power drill 1 in detail is the dust extractor 2, which includes a suction head 3, a suction tube 5, a tube elbow 6, and a dust box 7. The suction head 3 is located adjacent to the rotating tool, not shown, and is disposed coaxially to the drill axis 4. The exhaust air stream, generated with the aid of a ventilator or the like and carrying the dust particles, is conducted via the suction tube 5 and tube elbow 6 into the dust box 7, which is located in the lower part of the housing 8 of the power tool. The tube elbow 6, which connects the suction tube 5 to the dust box 7, may be a fixed component of the suction tube 5, but an embodiment as a separate component can optionally be considered, and it discharges into an inflow opening 9 located at the top (see FIG. 2) in the wall of the dust box 7. The air stream is carried out of the dust box 7 via an outlet opening 10, in which a filter element is advantageously disposed.

As can be seen from FIG. 1 in conjunction with the enlarged view in FIG. 2, in the region of the face end of the tube elbow 6, on the side toward the inflow opening 9, a closing flap 11 is integrated with the tube elbow and is intended to be adjusted between a closing position that blocks the flow course and an opening position that opens the flow course. The closing flap 11 is held on a spring wire 12, which is secured in bearing points disposed on the inner wall of the tube elbow 6. The spring wire 12 has an eyelet-like wire portion 12a, which forms the bearing for the pivotability of the closing flap 11. A middle portion 12b of the spring wire 12 forms a stop for the closing flap 11, on which the closing flap rests in the closing position. In the opening position, the closing flap pivots out of its contact with the stop portion 12b in the direction of the interior of the dust box 7. In this way it is assured that the closing flap 11 can open in the direction of the dust box 7 under the pressure of the air stream delivered that contains the dust particles, while conversely in the opposite direction, opening of the closing flap is effectively precluded because of the stop. The opening of the closing flap 11 is effected by elastically bending open the closing flap wall.

Figure 4:
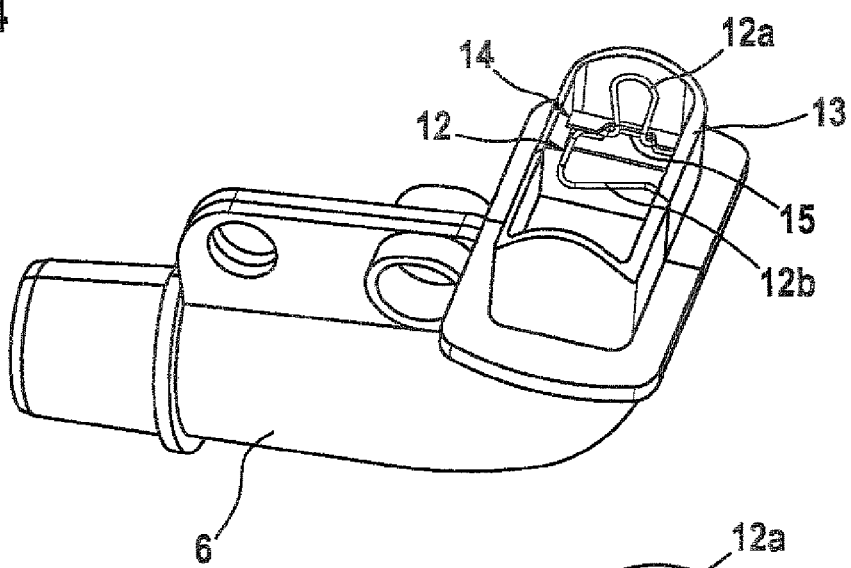
FIG. 4 is a further illustration of the tube elbow, with the spring wire inserted into the bearing point.
Figure 5:
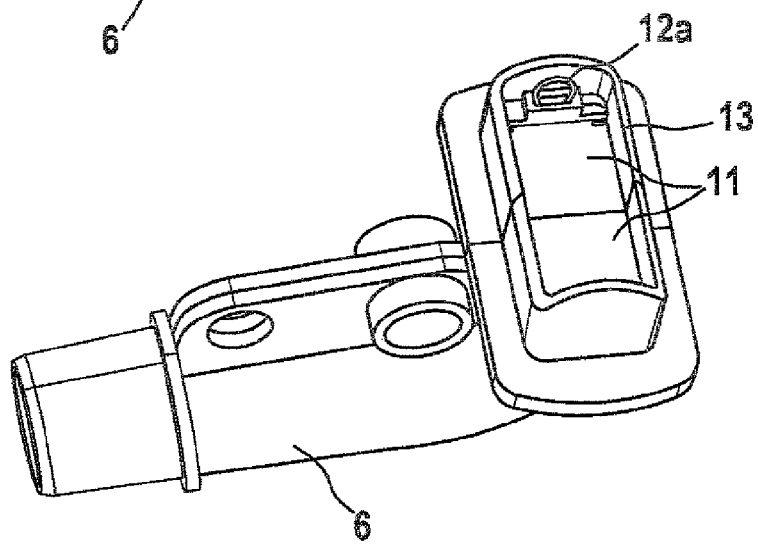
FIG. 5 is a further illustration of the tube elbow, with additionally inserted closing flaps.

In FIGS. 3 through 5, various steps in assembling the tube elbow 6 and the integration of the closing flap 11 are shown. FIG. 3 first shows the view of the face end 13 of the tube elbow 6, which end protrudes past the inflow opening in the wall of the dust box, before the closing flap is installed. On the inner wall of the tube elbow 6, adjacent to the face end 13, there is a bearing point 14, which comprises two wall portions, embodied in one piece with the inner wall, protruding transversely to the flow direction, and spaced apart axially from one another, between which wall portions a receiving groove 15 is formed, which serves to receive a bearing portion of the spring wire 12.

The installed situation with the spring wire inserted into the groove 15 is shown in FIG. 4. For reasons of symmetry, on each of the opposed inner sides of the wall of the tube elbow there are respective bearing points 14, each with a receiving groove 15 into each of which one bearing portion of the spring wire 12 is introduced. The eyelet-like wire portion 12a of the spring wire 12, in the installed position, is located adjacent to and approximately parallel to the inner wall of the tube elbow 6. In the region of the face end 13, the tube elbow has an approximately rectangular cross section, and the eyelet-like wire portions 12a and the bearing points 14 are located on the short side of the rectangle.

In FIG. 5, finally, the installed position is shown, with integrated closing flaps 11. Two closing flaps are provided, which are each pivotably supported on an eyelet-like wire portion 12a on opposed inner wall sides of the tube elbow 6. The two closing flaps 11 are disposed mirror-symmetrically to one another and in the closing position rest on their face ends against one another. However, an overlapping closing position can optionally be considered as well.

Figure 6:
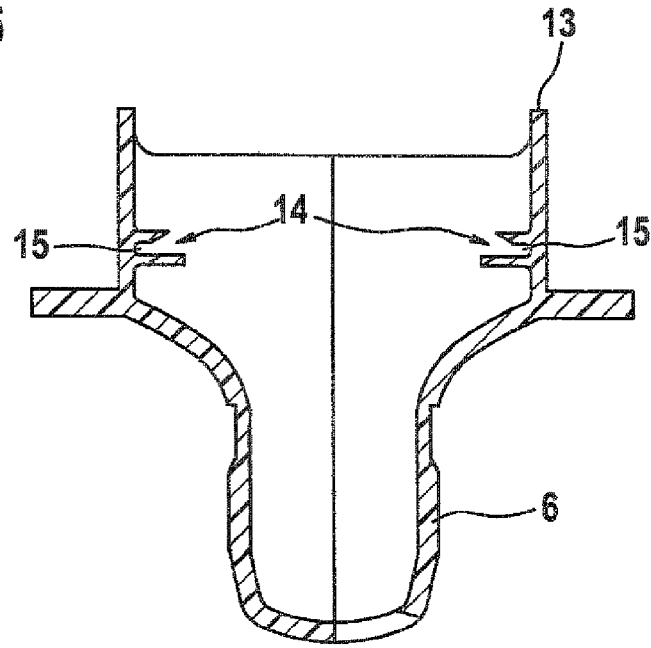
FIG. 6 is a section through the tube wall of the tube elbow in the region of the bearing points that receive the spring wire.

From the sectional view of the tube elbow 6 in FIG. 6, the bearing points 14, positioned on opposed inner wall sides of the tube elbow adjacent to the face end 13, can be seen, with the two wall portions protruding transversely into the flow course and with a receiving groove 15 between them.

Figure 7:
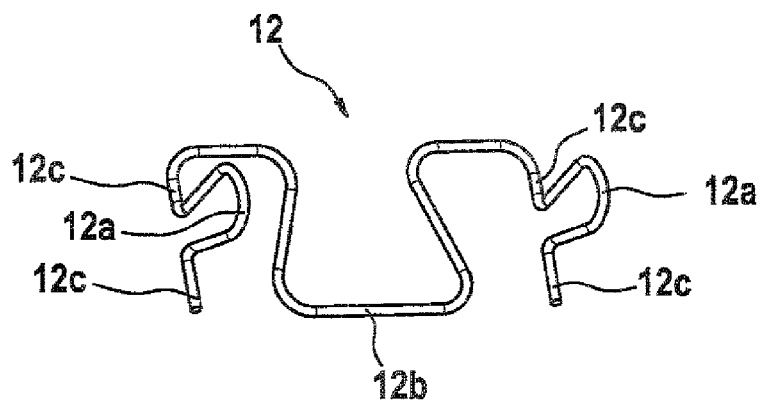
FIGS. 7 through 9 show various views of the spring wire.
Figure 8:
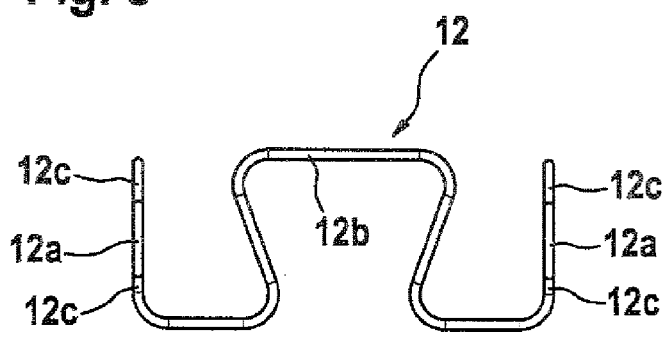
Figure 9:
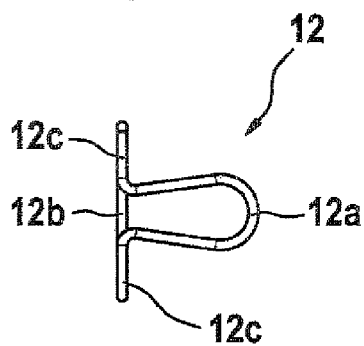

In FIGS. 7 through 9, the spring wire 12 is shown in various views, of which FIG. 7 shows a perspective view, FIG. 8 a top view, and FIG. 9 a side view. The spring wire 12 is bent three-dimensionally and in each of its outer regions it has a respective eyelet-like wire portion 12a, which in the installed position (FIG. 4) is located parallel to the inner wall, while conversely, a middle stop portion 12b, connecting the two eyelet-like wire portions 12a to one another, is located in a plane that is perpendicular to the plane that receives the eyelet-like wire portions 12a. The stop portion 12b extends with various segments in both directions of the stop plane. Furthermore, bearing portions 12c are provided, which are disposed on both sides of the eyelet-like wire portions 12a and are received in the receiving groove 15 of the bearing point 14 (FIG. 6) on the inner wall of the tube stub. The eyelet-like wire portion 12a forms a holder for the closing flap that in the closing position rests on the middle stop portion 12b.

Figure 10:
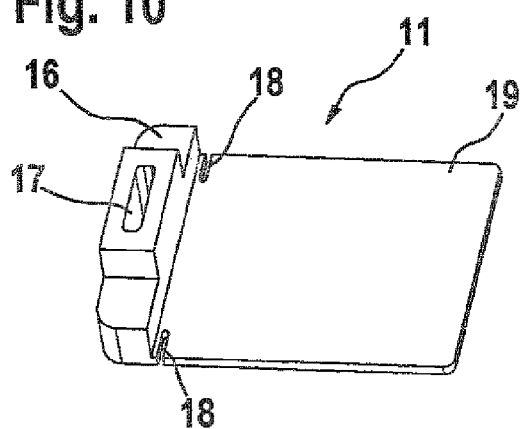
FIGS. 10 through 12 show various views of a closing flap.
Figure 11:
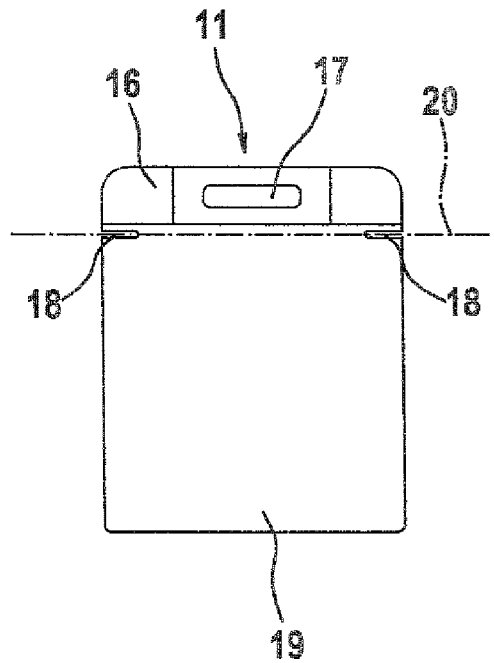
Figure 12:
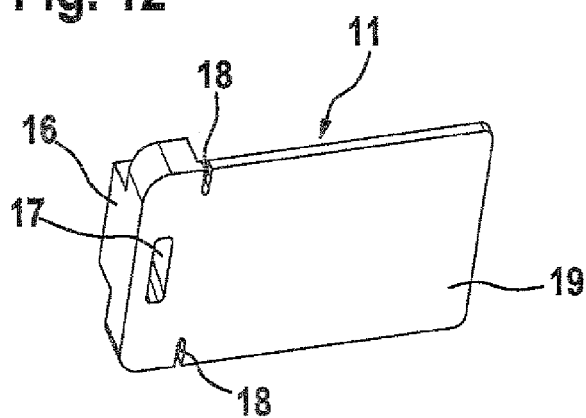

In FIGS. 10 through 12, various views of the closing flap 11 are shown; FIG. 10 is a first perspective view from above, FIG. 11 a top view, and FIG. 12 a second perspective view from below. The closing flap 11 comprises a bearing portion 16, into which a recess 17 is made for receiving the eyelet-like wire portion 12a of the spring wire 12, and a closing part 19 of slight wall thickness, which performs the actual closing function. The closing flap 11 is expediently made from a soft elastic material, such as rubber. The bearing portion 16 of the closing part 19 are embodied in one piece with one another, and between the thin-walled closing part 19 and the relatively thick bearing portion 16, respective lateral notches 18 are made, which enable and reinforce a relative pivoting motion of the closing part 19 with respect to the bearing portion 16. The two diametrically opposed notches 18 thus define a pivot axis 20 for the closing part 19, so that the closing part can be pivoted between the closing and opening positions.

Figure 13:
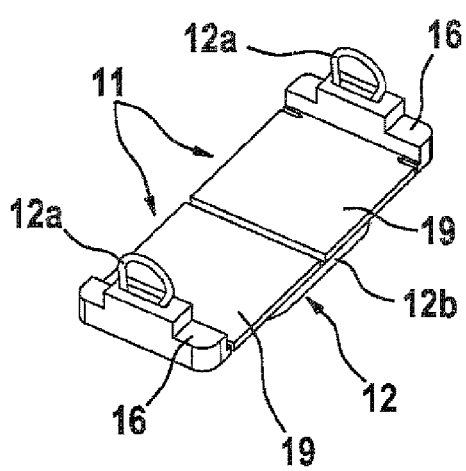
FIGS. 13 and 14 show two perspective views of two closing flaps mounted on the spring wire.
Figure 14:
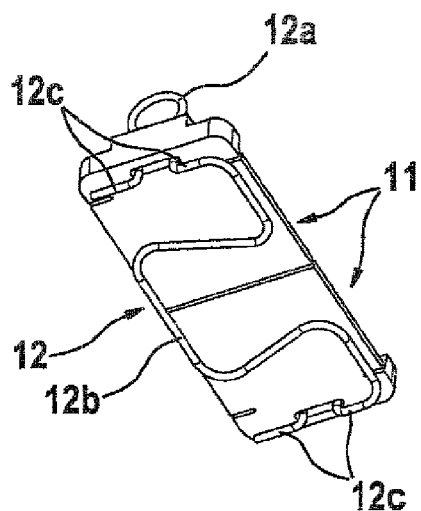

In FIGS. 13 and 14, two closing flaps 11 each are shown in the mounted position on the spring wire 12, in views from above (FIG. 13) and below (FIG. 14) in the closing position. The underside of the closing part 19, in the closing position, rests on the stop portion 12b of the spring wire 12 in linear fashion, and because of the length of the stop portion 12b, effective bracing is provided in two directions of the stop plane.

Figure 15:
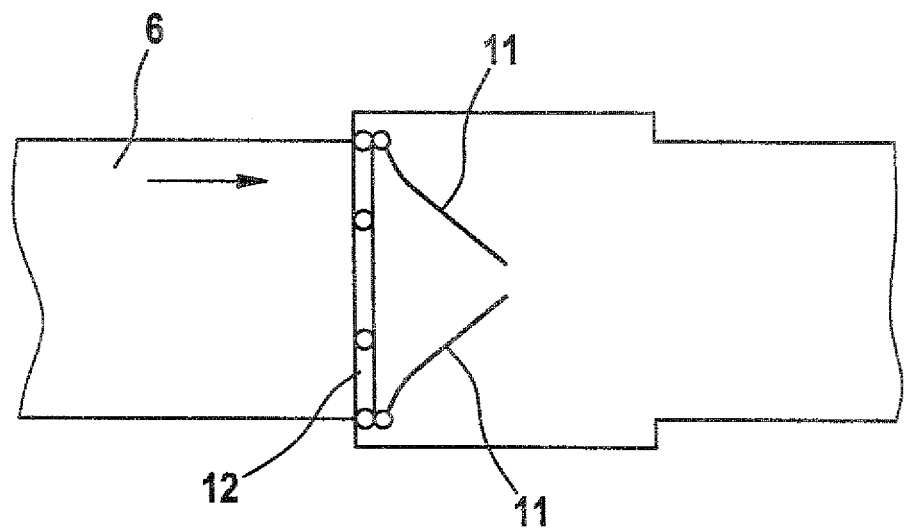
FIG. 15 is a schematic illustration of a tubular portion with two integrated closing flaps and with a spring wire that forms the stop.

In FIG. 15, a schematic view of the tubular portion 6 is shown, with two integrated closing flaps 11, which are pivotably supported on opposed inner sides of the wall of the tubular portion and can brace themselves on the spring wire 12 in the closing position. In the opening position, shown, the closing flaps 11 are pivoted about their joint near the wall and open the flow course in the direction of the dust box.

Figure 16:
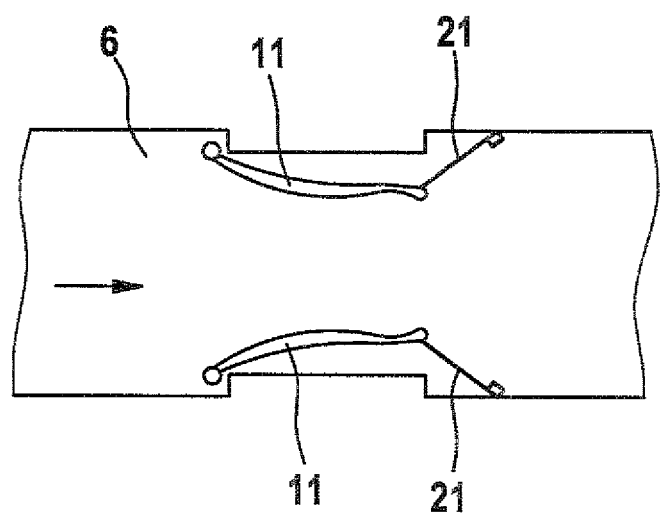
FIG. 16 is a schematic illustration of a tubular portion with integrated closing flaps in a further embodiment, in which the two closing flaps are urged into the opening position via elastic threads secured to the inner wall.

In FIG. 16, a further exemplary embodiment of a tubular portion 6 is shown, with two integrated closing flaps 11. The closing flaps 11 are each held in the opening position via an elastic thread 21, which is secured on one end to the inner wall of the tubular portion and on the other to the free face end of the closing flap. Upon a flow reversal, the closing flaps 11 can assume their closing position because of the elasticity of the threads 21, so that a return flow of air laden with dust particles from the dust box is prevented.

Figure 17:
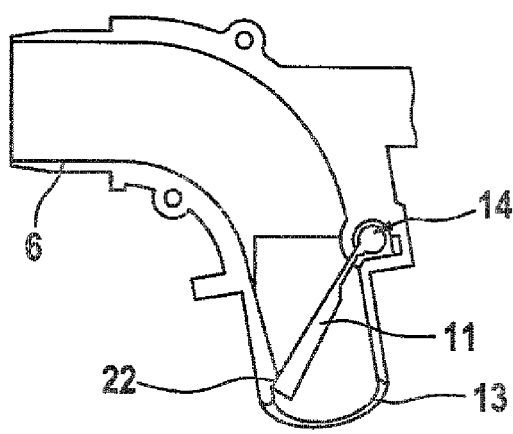
FIG. 17 shows a tube elbow as part of the flow course for the exhaust air containing the drilling dust, with an integrated closing flap which in the closing position rests on a stop that is embodied as a step in the inner wall of the elbow.
Figure 18:
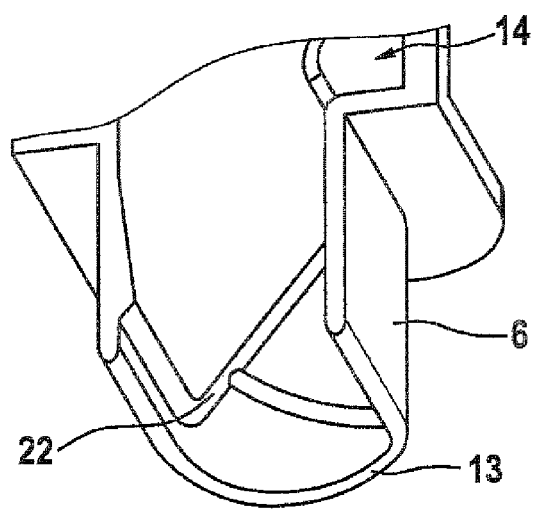
FIG. 18 is a view of the tube elbow, including the step that fog ins the stop.
Figure 19:
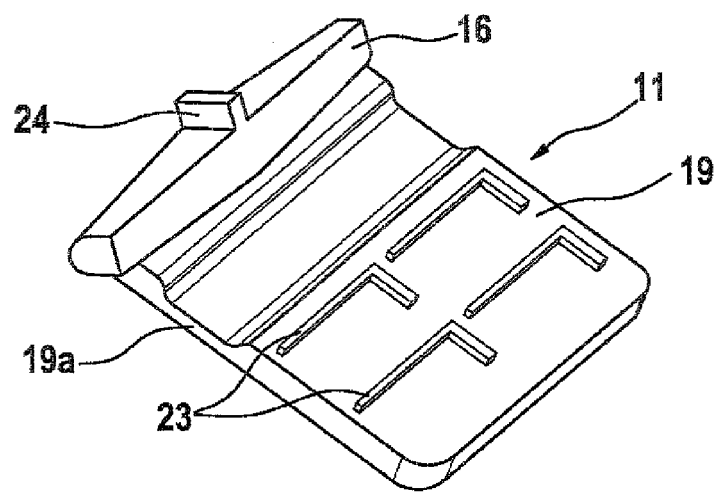
FIG. 19 shows the closing flap individually.

In FIGS. 17 through 19, a further exemplary embodiment of a tube elbow, with a single integrated closing flap, is shown. The tube elbow 6 has a bearing point 14 on only one inner side of the wall, and this bearing point is embodied as a cylindrical recess in the wall of the tube elbow and is embodied for receiving the bearing portion 16 at the closing flap 11. This bearing portion 16, as can be seen from FIG. 19, is adapted to the cross section of the recess in the bearing point 14; both the recess in the bearing point 14 and the bearing portion 16 have a cross section that is only part of a circle, so that a rotation of the bearing portion 16 of the closing flap 11 in the recess of the bearing point 14 is not possible. The pivotability of the closing flap 11 is on the contrary formed by a tapered wall portion 19a (FIG. 19), by way of which the closing part 19 of the closing flap 11 is joined to the bearing portion 16.

In the closing position, which is shown in FIG. 17, the closing flap 11 rests on a step 22, which is made into the inner side of the wall of the tube elbow 6 and extends obliquely to the flow direction through the tube elbow from one inner side of the wall to the opposite inner side of the wall. The step 22 has an angled portion, so that in the closing position, the closing flap 11 rests on the step 22 via a total of two stop lines.

For reinforcing the closing flap 11 that is made from soft elastic material, reinforcing ribs 23 may be disposed in the region of the closing part 19, as shown in FIG. 19. From this drawing it can also be seen that a mounting cam 24 is disposed on the bearing portion 16; it, is intended to prevent the bearing portion 16 from being mounted incorrectly in the recess of the bearing point 14.

The foregoing relates to the preferred exemplary embodiments of the invention, it being understood that other variants and embodiments thereof are possible within the spirit and scope of the invention, the latter being defined by the appended claims.

The invention claimed is:

1. A handheld power tool having a dust extractor, which comprises:
    a dust box for receiving dust;
    a tubular portion having an inner wall that defines a passage for guiding a flow of air into the dust box in a main flow direction;
    a spring wire secured to the inner wall at a first position and a second position, the second position being on an opposite side of the air flow passage from the first position, the spring wire including a first closing flap retaining portion at the first position, a second closing flap retaining portion at the second position, and a stop portion that extends across the air flow passage between the first position and the second position;
    a first closing flap pivotably retained on the first closing flap retaining portion, the first closing flap being pivotable in a direction toward the dust box from a closing position at which the first closing flap rests against the stop portion to an opening position at which the first closing flap is spaced apart from the stop portion; and
    a second closing flap pivotably retained on the second closing flap retaining portion, the second closing flap being pivotable in a direction toward the dust box from a closing position at which the second closing flap rests against the stop portion to an opening position at which the second closing flap is spaced apart from the stop portion,
    wherein the passage is opened when the first closing flap and the second closing flap are in the opening position and the passage is closed when the first closing flap and the second closing flap are in the closing position, and
    wherein movement of the first closing flap and the second closing flap beyond the closing position, in a direction opposite to the main flow direction, is prevented by the stop portion of the spring wire.

2. The handheld power tool as defined by claim 1, wherein the spring wire acts as a holder of the closing flaps.

3. The handheld power tool as defined by claim 2, wherein each of the first and second closing flap retaining portions comprise an eyelet portion, which protrudes into a recess in each respective closing flap.

4. The handheld power tool as defined by claim 3, wherein the spring wire has a middle stop portion.

5. The handheld power tool as defined by claim 4, wherein the spring wire has a bearing portion, which is received in a bearing point on an inner wall of the tube.

6. The handheld power tool as defined by claim 2, wherein the spring wire has a middle stop portion.

7. The handheld power tool as defined by claim 2, wherein the spring wire has a bearing portion, which is received in a bearing point on an inner wall of the tube.

8. The handheld power tool as defined by claim 1, wherein each closing flap comprises a soft elastic material.

9. The handheld power tool as defined by claim 1, wherein each closing flap is urged into its closing position by internal stress.

10. The handheld power tool as defined by claim 1, wherein each closing flap has reinforcing ribs.

11. The handheld power tool as defined by claim 1, wherein the two closing flaps are disposed on opposed sides of the inner wall of the tubular portion.

12. The handheld power tool as defined by claim 11, wherein the two closing flaps are embodied in mirror symmetry to one another.

13. The handheld power tool as defined by claim 1, wherein each closing flap includes a bearing portion, which is received in a bearing point on the tubular portion, and a closing part, which is intended to be pivoted about a pivot axis relative to the bearing portion.

14. The handheld power tool as defined by claim 13, wherein between the bearing portion and the closing part, a tapered wall portion is formed.

15. The handheld power tool as defined by claim 13, wherein at a transition from the bearing portion to the closing part, there is at least one notch.

16. The handheld power tool as defined by claim 1, wherein the tubular portion is embodied as a tube elbow, which communicates with an inflow opening in the dust box.

17. The handheld power tool as defined by claim 1, wherein each closing flap is pivotable about an axis in a region of the inner wall of the tubular portion.

* * * * *